(12) United States Patent
Kim

(10) Patent No.: US 7,956,945 B2
(45) Date of Patent: Jun. 7, 2011

(54) ARRAY SUBSTRATE FOR LIQUID CRYSTAL DISPLAY DEVICE

(75) Inventor: Bung-Goo Kim, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 323 days.

(21) Appl. No.: 12/292,951

(22) Filed: Dec. 1, 2008

(65) Prior Publication Data

US 2009/0310051 A1    Dec. 17, 2009

(30) Foreign Application Priority Data

Jun. 13, 2008  (KR) ................. 10-2008-0055901

(51) Int. Cl.
*G02F 1/1333* (2006.01)
(52) U.S. Cl. ........................................................ 349/40
(58) Field of Classification Search .................. 349/40
See application file for complete search history.

(56) References Cited

U.S. PATENT DOCUMENTS

| | | | |
|---|---|---|---|
| 2008/0129674 A1* | 6/2008 | Abe et al. ............... | 345/92 |
| 2008/0135846 A1* | 6/2008 | Shin et al. ............... | 257/59 |
| 2009/0032819 A1* | 2/2009 | Lim et al. ............... | 257/72 |
| 2010/0157191 A1* | 6/2010 | Jeoung et al. ........... | 349/54 |

FOREIGN PATENT DOCUMENTS

| | | |
|---|---|---|
| CN | 1388404 A | 1/2003 |
| KR | 10-1999-0081110 | 11/1999 |
| KR | 2007120385 A * | 12/2007 |

* cited by examiner

*Primary Examiner* — Michelle R Connelly Cushwa
(74) *Attorney, Agent, or Firm* — Morgan, Lewis & Bockius LLP

(57) ABSTRACT

An array substrate for a liquid crystal display device includes a substrate having a display region and a non-display region at a periphery of the display region; a gate line, a data line, a thin film transistor and a pixel electrode on the substrate and in the display region; a drive integrated circuit on the substrate and in the non-display region; first and second test pads at both sides of the drive integrated circuit, respectively; a common voltage line on the substrate and along edges of the non-display region; and first and second static electricity protecting units on the substrate and in the display region, the first static electricity protecting unit connecting the first test pad with the common voltage line, and the second static electricity protecting unit connecting the second test pad with the common voltage line.

20 Claims, 5 Drawing Sheets

ARRAY SUBSTRATE FOR LIQUID CRYSTAL DISPLAY DEVICE

The present application claims the benefit of Korean Patent Application No. 10-2008-0055901 filed in Korea on Jun. 13, 2008, which is hereby incorporated by reference in its entirety.

BACKGROUND OF THE INVENTION

1. Field of the Invention

The present invention relates to an array substrate for a liquid crystal display (LCD) device and more particularly to an array substrate for an LCD device being capable of preventing damages from a static electricity.

2. Discussion of the Related Art

A related art liquid crystal display (LCD) device uses optical anisotropy and polarization properties of liquid crystal molecules. The liquid crystal molecules have a definite alignment direction as a result of their thin and long shapes. The alignment direction of the liquid crystal molecules can be controlled by applying an electric field across the liquid crystal molecules. In other words, as the intensity or direction of the electric field is changed, the alignment of the liquid crystal molecules also changes. Since incident light is refracted based on the orientation of the liquid crystal molecules due to the optical anisotropy of the liquid crystal molecules, images can be displayed by controlling light transmissivity.

Since the LCD device including a thin film transistor (TFT) as a switching element, referred to as an active matrix LCD (AM-LCD) device, has excellent characteristics of high resolution and displaying moving images, the AM-LCD device has been widely used.

FIG. 1 is a schematic plan view showing the related art LCD device. In FIG. 1, the LCD device 1 includes a color filter substrate 50, an array substrate 10 and a liquid crystal layer (not shown) therebetween. A display region AA for displaying images and a non-display region (NAA) at a periphery of the display region AA are defined on each of the color filter substrate 50 and the array substrate 10. The color filter substrate 50, the array substrate 10 and the liquid crystal layer (not shown) constitute a liquid crystal panel.

Although not shown, a black matrix for blocking light from a backlight unit (not shown) and corresponding to the non-display region NAA, a color filter layer including sub-color filters of red, green and blue colors and corresponding to the display region AA, and a common electrode on an entire lower surface of the color filter layer are formed on a lower surface of the color filter substrate 50.

A plurality of gate lines 20, a plurality of data lines 30, a plurality of thin film transistors (TFTs) T and a plurality of pixel electrodes 70 are formed in the display region AA of the array substrate 10. The gate lines 20 receive a scanning signal. The data lines 30 receive a data signal and cross the gate lines 20 to define a plurality of pixel regions P. Each of the TFTs T is disposed at each crossing portion of the gate and data lines 20 and 30. Each of the pixel electrodes 70 is connected to each TFT and disposed in each pixel region P.

In addition, a plurality of gate extending lines 22 and a plurality of data extending lines 32 are formed in the non-display region NAA of the array substrate 10. Each of the gate extending lines 22 is connected to each gate line 20 and applies the scanning signal from a drive integrate circuit (IC) 35 into the each gate line 20. Each of the data extending lines 32 is connected to each data line 30 and applies the data signal from the drive IC 35 into the each data line 30.

A common voltage line 50 is formed on edges of the non-display region NAA. The common voltage line 50 applies a common signal from an external common voltage generating unit (not shown) through a flexible printed circuit (FPC) 90 into the common electrode (not shown) on an entire surface of the color filter substrate 50 through a plurality of conductive units 86 at four corners of the liquid crystal panel. First and second test pads 60 and 62 for testing properties of the scanning and data signals, for example, a waveform or/and a magnitude of the signals, is formed at both sides of the drive IC 35, respectively. A pad unit 75 connected to the FPC 90 is positioned at a lower side of drive IC 35. The pad unit 75 connected to the FPC 90 receives a driving voltage from an external system (not shown) through a FPC connector 92. The conductive units 186 may include a silver dot.

An arrangement of liquid crystal molecules in the liquid crystal layer (not shown) is changed by a potential difference between the common voltage applied to the common electrode (not shown) and the data signal applied to the pixel electrode 70 through the drive IC 35 and the TFT T in a period, images are displayed by controlling light transmissivity depending on the arrangement of the liquid crystal molecules in the above-mentioned LCD device 1.

A static electricity is not induced on the array substrate 10 of a silica-based glass. However, in a process of forming electrodes and lines on the array substrate 10, a static electricity may be induced at the drive IC 35 and the first and second test pads 60 and 62 because of particles in a processing chamber or a pulse-type current.

The static electricity induced at the drive IC 35 and the first and second test pads 60 and 62 flows into the gate and data lines 20 and 30 such that a desired operation of the TFT can not be obtained. Accordingly, a production yield is reduced.

SUMMARY OF THE INVENTION

Accordingly, the present invention is directed to an array substrate for an LCD device that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, an array substrate for a liquid crystal display device includes a substrate having a display region and a non-display region at a periphery of the display region; a gate line, a data line, a thin film transistor and a pixel electrode on the substrate and in the display region; a drive integrated circuit on the substrate and in the non-display region; first and second test pads at both sides of the drive integrated circuit, respectively; a common voltage line on the substrate and along edges of the non-display region; and first and second static electricity protecting units on the substrate and in the display region, the first static electricity protecting unit connecting the first test pad with the common voltage line, and the second static electricity protecting unit connecting the second test pad with the common voltage line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments, examples of which are illustrated in the accompanying drawings.

In the present invention, a plurality of test pads for testing a magnitude or/and a waveform of a gate signal, a data signal and a common voltage is connected to a plurality of static electricity protecting units.

Figure 1:
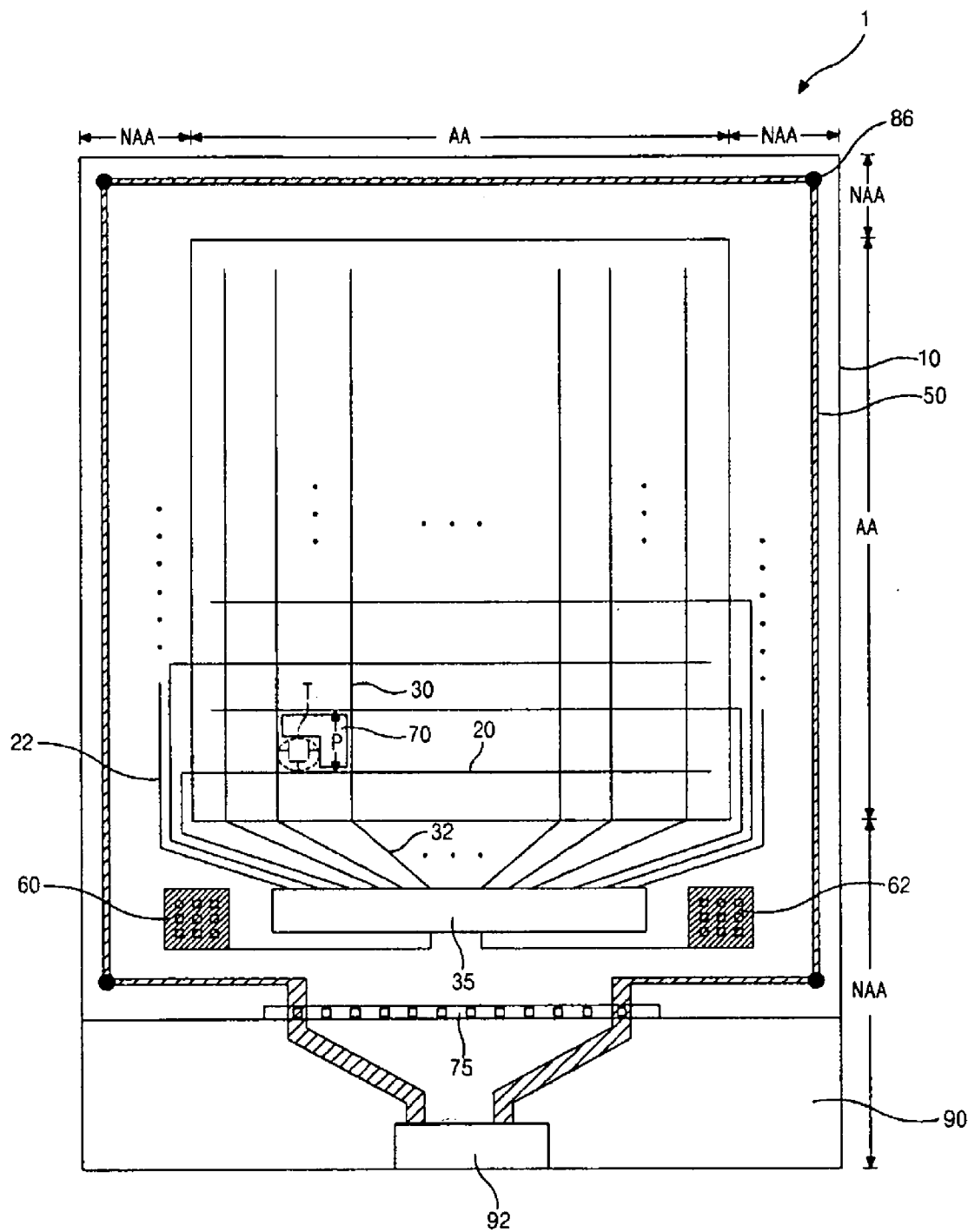
FIG. 1 is a schematic plan view showing the related art LCD device.
Figure 2:
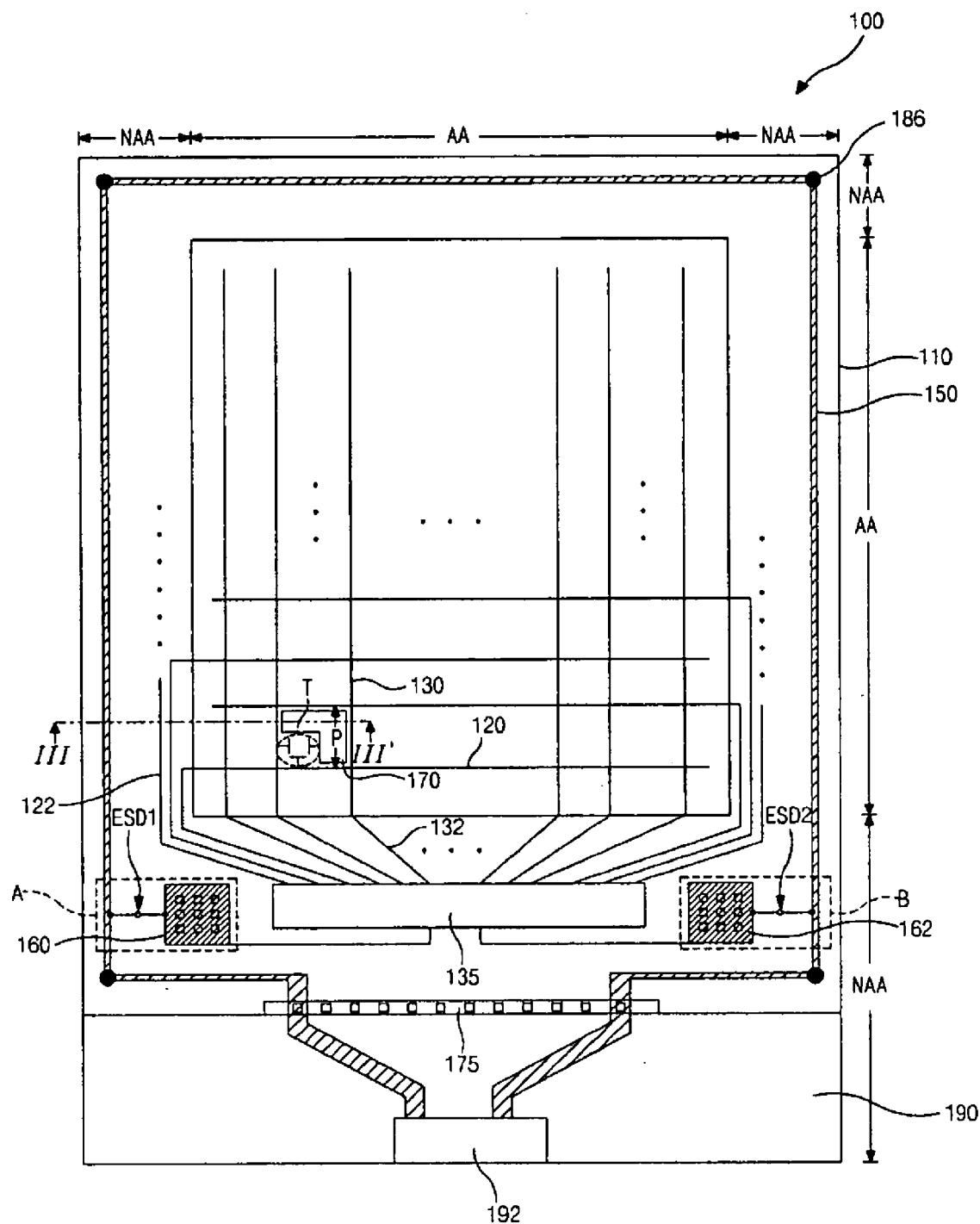
FIG. 2 is a schematic plan view showing an LCD device according to the present invention.
Figure 3:
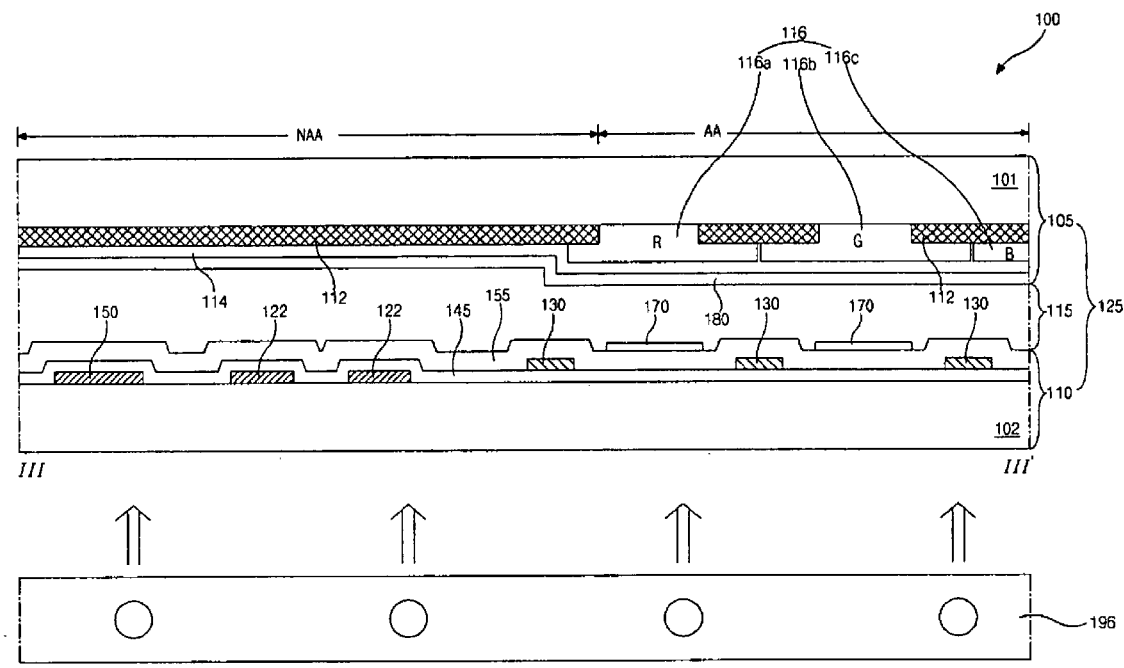
FIG. 3 is a cross-sectional view of a portion taken along the line III-III'.

FIG. 2 is a schematic plan view showing an LCD device according to the present invention, and FIG. 3 is a cross-sectional view of a portion taken along the line III-III'. In FIGS. 2 and 3, an LCD device according to the present invention includes a color filter substrate 105, an array substrate 110 and a liquid crystal layer 115 therebetween. A display region AA for displaying images and a non-display region (NAA) at a periphery of the display region AA are defined on each of the color filter substrate 105 and the array substrate 110. A backlight unit 196 for projecting light onto the array substrate 110 is disposed under the array substrate 110. The backlight unit 196 may be spaced apart from the array substrate 110. The color filter substrate 105, the array substrate 110 and the liquid crystal layer 115 constitute a liquid crystal panel 125.

A black matrix 112 for blocking light from the backlight unit 196 and corresponding to the non-display region NAA and a space between pixel regions P in the display region AA, a color filter layer 116 including sub-color filters 116a, 116b and 116c of red, green and blue colors and corresponding to the display region AA, an overcoat layer 114 on the color filter layer 116 and a common electrode 180 on an entire lower surface of the overcoat layer 114 are formed on a lower surface of a first substrate 101 of the color filter substrate 105.

A plurality of gate lines 120, a plurality of data lines 130, a plurality of thin film transistors (TFTs) T and a plurality of pixel electrodes 170 are formed in the display region AA of a second substrate 102 of the array substrate 110. The gate lines 120 receive a scanning signal. The data lines 130 receive a data signal and cross the gate lines 120 to define a plurality of pixel regions P. Each of the TFTs T is disposed at each crossing portion of the gate and data lines 120 and 130. Each of the pixel electrodes 170 is connected to each TFT and disposed in each pixel region P. Although not shown, the TFT T includes a gate electrode, a semiconductor layer including an active layer of intrinsic amorphous silicon and an ohmic contact layer of impurity-doped amorphous silicon, a source electrode and a drain electrode. The gate electrode is connected to the gate line 120, and the source electrode is connected to the data line 130. The drain electrode is spaced apart from the source electrode. The pixel electrode 170 is connected to the drain electrode.

In addition, a plurality of gate extending lines 122 and a plurality of data extending lines 132 are formed in the non-display region NAA of the second substrate 102 of the array substrate 110. Each of the gate extending lines 122 is connected to each gate line 120 and applies the scanning signal from a drive integrate circuit (IC) 135 into the each gate line 120. Each of the data extending lines 132 is connected to each data line 130 and applies the data signal from the drive IC 135 into the each data line 130.

A common voltage line 150 is formed on edges of the non-display region NAA. The common voltage line 150 applies a common signal from an external common voltage generating unit (not shown) through a flexible printed circuit (FPC) 190 into the common electrode 180 on an entire surface of the color filter substrate 105 through a plurality of conductive units 186 at four corners of the liquid crystal panel 125. First and second test pads 160 and 162 for testing properties of the scanning and data signals, for example, a waveform or/and a magnitude of the signals, is formed at both sides of the drive IC 135, respectively. One of the first and second test pads 160 and 162 tests properties of the scanning signal applied into the gate line 120, and the other one of the first and second test pads 160 and 162 tests properties of the data signal applied into the data line 130.

First and second static electricity protecting units ESD1 and ESD2 are disposed between the first test pad 160 and the common voltage line 150 and between the second test pad 162 and the common voltage line 150. The first text pad 160 is connected to the common voltage line 150 through the first static electricity protecting unit ESD1, and the second text pad 162 is connected to the common voltage line 150 through the second static electricity protecting unit ESD2. A pad unit 175 connected to the FPC 190 is positioned at a lower side of drive IC 135. The pad unit 175 connected to the FPC 190 receives a driving voltage from an external system (not shown) through a FPC connector 192.

The conductive units 186 may include one of a gold ball, a silver dot and a silver paste. In an in-plane switching (IPS) mode LCD device, where not only the pixel electrode but also the common electrode being parallel to and alternately arranged with the pixel electrode is formed on the array substrate, and an LCD device having a storage capacitor of a storage on common type, where a storage line, which overlaps the pixel electrode to form the storage capacitor, is formed in the non-display region and parallel to the gate line, a third test pad for testing properties of the common signal, for example, a waveform or/and a magnitude of the signal, applying into the common electrode or the storage line may be formed at a side of the first test pad 160 or the second test pad 162. In this case, a third static electricity protecting unit connecting the third test pad with the common voltage line may be formed. A number of each of the first to third test pads is determined considering a model of the LCD device. There may be several first test pads 160 and several second test pads 162. In this case, numbers of the first and second static electricity protecting units ESD1 and ESD2 corresponds to numbers of the first and second test pads 160 and 162, respectively.

Even if a static electricity is induced on the drive IC 135 and the first and second test pads 160 and 162 because of particles in a processing chamber or a pulse-type current in a process of forming electrodes and lines on the array substrate 110, there is no damage on the drive IC 135 and the first and second test pads 160 and 162 due to the first and second static electricity protecting units ESD1 and ESD2. The static electricity flows into the common voltage line 150 through the first and second static electricity protecting units ESD1 and ESD2. Since the static electricity is uniformly distributed onto an entire region of the liquid crystal panel 125 through the common voltage line 150 along edges of the array substrate 110, the liquid crystal panel 125 has an equipotential condition as a whole such that damages resulted from the static electricity are prevented or minimized.

Figure 4:
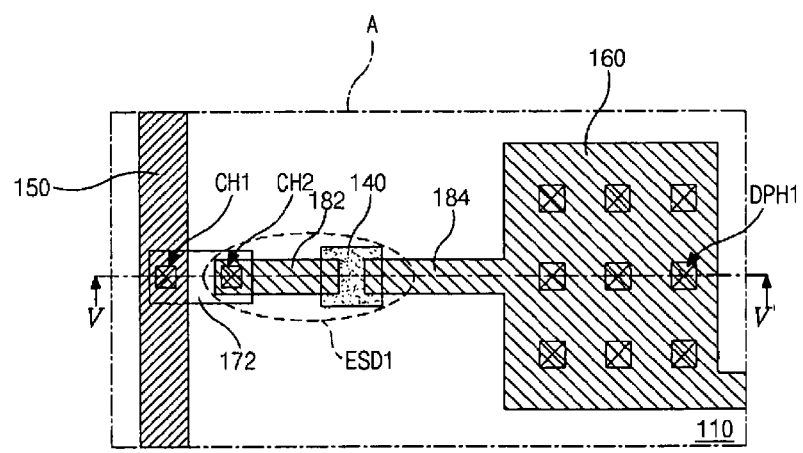
FIG. 4 is an enlarged plan view of "A" portion of FIG. 2.
Figure 5:
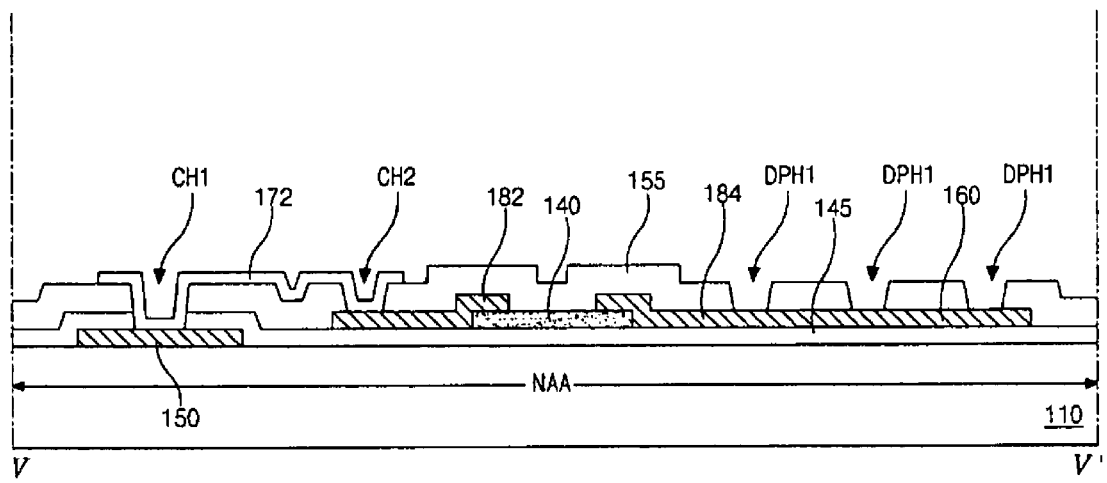
FIG. 5 is a cross-sectional view of a portion taken along the line V-V' of FIG. 4.

FIG. 4 is an enlarged plan view of "A" portion of FIG. 2, and FIG. 5 is a cross-sectional view of a portion taken along the line V-V' of FIG. 4. FIGS. 4 and 5 show the first test pad for testing the data signal of the data line.

In FIGS. 4 and 5, the common voltage line 150 of a first metallic material is formed in the non-display region NAA of the array substrate 110. The common voltage line 150 may be formed on the same layer and of the same material as the gate line 120 (of FIG. 2). A gate insulating layer 145 of an inorganic insulating material is formed on the common voltage line 150. The inorganic insulating material includes one of silicon oxide or silicon nitride.

A first semiconductor pattern 140 of an intrinsic amorphous silicon is formed at one side of the common voltage line 150 and on the gate insulating layer 145. The first semiconductor pattern 140 is spaced apart from the common voltage line 150. The first semiconductor pattern 140 may be formed on the same layer and of the same material as an active layer (not shown) of the TFT T (of FIG. 2). First and second discharging lines 182 and 184 are formed at both sides of the first semiconductor pattern 140, respectively, on the gate insulating layer 145. A portion of the first discharging line 182 overlaps a portion of the first semiconductor pattern 140, and a portion of the second discharging line 184 overlaps a portion of the first semiconductor pattern 140. The second discharging line 184 extends to form the first test pad 160. Each of the first and second discharging lines 182 and 184 and the first test pad 160 is formed on the same layer and of the same material as the data line 130 (of FIG. 2). The first test pad 160 may have a greater width than the second discharging line 184. The second discharging line 184 is positioned between the first semiconductor pattern 140 and the first test pad 160.

A passivation layer 155 including a first contact hole CH1, a second contact hole CH2 and a plurality of first test pad opening holes DPH1 is formed on the array substrate 110 including the first static electricity protecting unit ESD1. The passivation layer 155 may be formed of an inorganic insulating material or an organic insulating material. The inorganic insulating material may include one of silicon oxide and silicon nitride. The first and second contact holes CH1 and CH2 expose the common voltage line 150 and the first discharging line 182, respectively, and the plurality of first test pad opening holes DPH1 expose the first test pad 160.

A first connection pattern 172 is formed on the passivation layer 155. One side of the first connection pattern 172 is connected to the common voltage line 150 through the first contact hole CH1, and the other side of the first connection pattern 172 is connected to the first discharging line 182 through the second contact hole CH2. The first connection pattern 172 may be transparent. The transparent conductive material includes one of indium-tin-oxide (ITO) and indium-zinc-oxide (IZO). The first connection pattern 172 may be formed on the same layer and of the same material as the pixel electrode 170 (of FIG. 2). The first discharging line 182, the second discharging line 184, the first semiconductor pattern 140 and the first connection line 172 constitute the first static electricity protecting unit ESD1.

When a static electricity is induced on the drive IC 135 and the first and second test pads 160 and 162 because of particles in a processing chamber or a pulse-type current in a process of forming the above LCD device, the static electricity does not flow into the gate extending line 122, the gate line 120, the data extending line 132 and the data line 130 through the drive IC 135, and the static electricity flows into the common line 150 through the first semiconductor pattern 140 of the first static electricity protecting unit ESD1. Since the static electricity is uniformly distributed onto an entire region of the liquid crystal panel 125 through the common voltage line 150, the liquid crystal panel 125 has an equipotential condition as a whole such that damages resulted from the static electricity are prevented or minimized.

Figure 6:
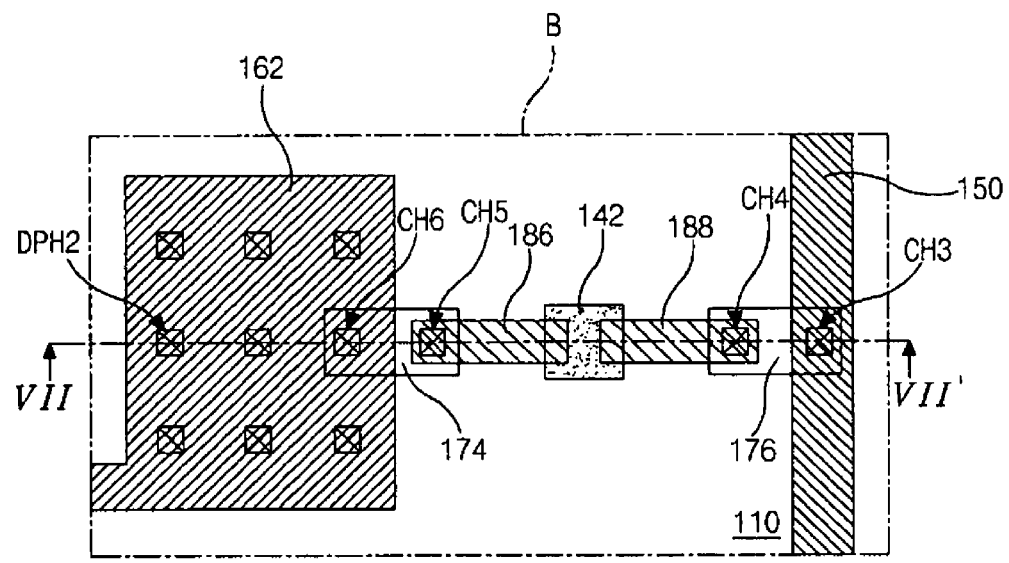
FIG. 6 is an enlarged plan view of "B" portion of FIG. 2.
Figure 7:
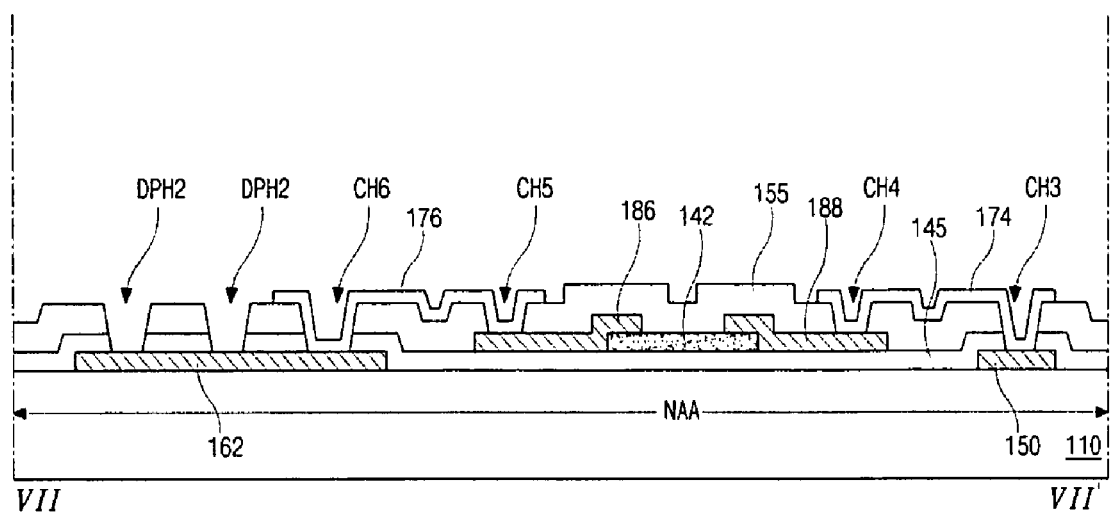
FIG. 7 is a cross-sectional view of a portion taken along the line VII-VII' of FIG. 7.

FIG. 6 is an enlarged plan view of "B" portion of FIG. 2, and FIG. 7 is a cross-sectional view of a portion taken along the line VII-VII' of FIG. 7. FIGS. 6 and 7 show the first test pad for testing the scanning signal of the gate line.

In FIGS. 6 and 7, the common voltage line 150 of a first metallic material is formed in the non-display region NAA of the array substrate 110. The second test pad 162 being spaced apart from the common voltage line 150 is also formed in the non-display region NAA of the array substrate 110. The second test pad 162 is formed on the same layer and of the same material as the gate line 120 (of FIG. 2). A gate insulating layer 145 of an inorganic insulating material is formed on the common voltage line 150 and the second test pad 162. The inorganic insulating material includes one of silicon oxide or silicon nitride.

A second semiconductor pattern 142 of an intrinsic amorphous silicon is formed on the gate insulating layer 145 and disposed between the common voltage line 150 and the second test pad 162. The second semiconductor pattern 142 may be formed on the same layer and of the same material as an active layer (not shown) of the TFT T (of FIG. 2). Third and fourth discharging lines 186 and 188 are formed at both sides of the second semiconductor pattern 142, respectively, on the gate insulating layer 145. A portion of the third discharging line 186 overlaps a portion of the second semiconductor pattern 142, and a portion of the fourth discharging line 188 overlaps a portion of the second semiconductor pattern 142. Each of the third and fourth discharging lines 186 and 188 is formed on the same layer and of the same material as the data line 130 (of FIG. 2). The third discharging line 186 is positioned between the second semiconductor pattern 142 and the second test pad 162. The second test pad 162 may have a greater width than the third discharging line 186.

A passivation layer 155 including a third contact hole CH3, a fourth contact hole CH4, a fifth contact hole CH5, a sixth contact hole CH6 and a plurality of second test pad opening holes DPH2 is formed on the array substrate 110 including the second static electricity protecting unit ESD2. The third, fourth, fifth and sixth contact holes CH3, CH4, CH5 and CH6 expose the common voltage line 150, the fourth discharging line 188, the third discharging line 186 and the second test pad 162, respectively, and the plurality of second test pad opening holes DPH2 expose the second test pad 162.

A second connection pattern 174 and a third connection pattern 176 are formed on the passivation layer 155. One side of the second connection pattern 174 is connected to the common voltage line 150 through the third contact hole CH3, and the other side of the second connection pattern 174 is connected to the fourth discharging line 188 through the fourth contact hole CH4. One side of the third connection pattern 176 is connected to the third discharging line 186 through the fifth contact hole CH5, and the other side of the third connection pattern 176 is connected to the second test pad 162 through the sixth contact hole CH6. Each of the second and third connection patterns 174 and 176 may be formed of a transparent conductive material. The transparent conductive material includes one of indium-tin-oxide (ITO) and indium-zinc-oxide (IZO). Each of the second and third connection patterns 174 and 176 may be formed on the same layer and of the same material as the pixel electrode 170 (of FIG. 2). The third discharging line 186, the fourth discharging line 188 and the second semiconductor pattern 142, the second connection pattern 174 and the third connection pattern 176 constitute the second static electricity protecting unit ESD2.

In the LCD device of the present invention, since the static electricity protecting units are connected to the test pads and the common voltage line, damages resulted from the static electricity are prevented or minimized.

A principle of the present invention is applied into LCD devices without limitation of their sizes. Moreover, a principle of the present invention is applied into an in-plane switching (IPS) mode LCD device, where not only the pixel electrode but also the common electrode is formed on the array substrate, and an LCD device having a storage capacitor of a storage on common type.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An array substrate for a liquid crystal display device, comprising:
    a substrate having a display region and a non-display region at a periphery of the display region;
    a gate line, a data line, a thin film transistor and a pixel electrode on the substrate and in the display region;
    a drive integrated circuit on the substrate and in the non-display region;
    first and second test pads at both sides of the drive integrated circuit, respectively;
    a common voltage line on the substrate and along edges of the non-display region; and
    first and second static electricity protecting units on the substrate and in the display region, the first static electricity protecting unit connecting the first test pad with the common voltage line, and the second static electricity protecting unit connecting the second test pad with the common voltage line,
    wherein the first static electricity protecting unit includes a semiconductor pattern, a first discharging line and a second discharging line respectively disposed at both sides of the semiconductor pattern, and a connection pattern, wherein the semiconductor pattern is disposed on the gate insulating layer on the common voltage line and positioned between the common voltage line and the first test pad, wherein portions of the first and second discharging lines overlap the semiconductor pattern and the second discharging line extends from the first test pad, and wherein the connection pattern connects the first discharging line with the common voltage line.

2. The array substrate according to claim 1, wherein the thin film transistor includes a gate electrode connected to the gate line, a semiconductor layer disposed on a gate insulating layer and corresponding to the gate electrode, a source electrode on the semiconductor layer and connected to the data line and a drain electrode on the semiconductor layer and spaced apart from the source electrode, and wherein the semiconductor layer includes an active layer of intrinsic amorphous silicon and an ohmic contact layer of impurity-doped amorphous silicon.

3. The array substrate according to claim 2, wherein the second static electricity protecting unit includes a semiconductor pattern, a first discharging line, a second discharging line respectively disposed at both sides of the semiconductor pattern, a first connection pattern and a second connection pattern, the semiconductor pattern is disposed on the gate insulating layer on the common voltage line and positioned between the common voltage line and the second test pad, wherein portions of the first and second discharging lines overlap the semiconductor pattern, and wherein the first connection pattern connects the second discharging line with the common voltage line, and the second connection pattern connects the first discharging line with the second test pad.

4. The array substrate according to claim 3, wherein the semiconductor pattern is formed of the same material and on the same layer as the active layer.

5. The array substrate according to claim 3, wherein each of the first and second discharging lines is formed of the same material and on the same layer as the data line.

6. The array substrate according to claim 3, wherein the second test pad has a larger width than the first discharging line.

7. The array substrate according to claim 3, further comprising a passivation layer including a first contact hole exposing the common voltage line, a second contact hole exposing the second discharging line, a third contact hole exposing the first discharging line and fourth contact hole exposing the second test pad, wherein the first connection pattern is disposed on the passivation layer and contacts the common voltage line through the first contact hole and the second discharging line through the second contact hole, and wherein the second connection pattern is disposed on the passivation layer and contacts the first discharging line through the third contact hole and the second test pad through the fourth contact hole.

8. The array substrate according to claim 3, wherein each of the first and second connection patterns is formed of the same layer and on the same material as the pixel electrode.

9. The array substrate according to claim 1, wherein the semiconductor pattern is formed of the same material and on the same layer as the active layer.

10. The array substrate according to claim 1, wherein each of the first and second discharging lines is formed of the same material and on the same layer as the data line.

11. The array substrate according to claim 1, wherein the first test pad has a larger width than the second discharging line.

12. The array substrate according to claim 1, further comprising a passivation layer including a first contact hole exposing the common voltage line and a second contact hole exposing the first discharging line, wherein the connection pattern is disposed on the passivation layer and contacts the common voltage line through the first contact hole and the first discharging line through the second contact hole.

13. The array substrate according to claim 1, wherein the connection pattern is formed of the same layer and on the same material as the pixel electrode.

14. The array substrate according claim 1, wherein the first test pad is formed of the same material and on the same layer as the data line.

15. The array substrate according to claim 1, wherein the second test pad is formed of the same material and on the same layer as the common voltage line and the gate line.

16. The array substrate according to claim 1, wherein a number of the first static electricity protecting unit corresponds to a number of the first test pad, and a number of the second static electricity protecting unit corresponds to a number of the second test pad.

17. The array substrate according to claim 1, wherein one of the first and second test pads tests a scanning signal applied into the gate line, and the other one of the first and second test pads tests a data signal applied into the data line.

18. The array substrate according to claim 1, further comprising a common electrode being parallel to the pixel electrode, a third test pad for testing a common signal applied to the common electrode and a third static electricity protecting unit connected to the third test pad.

19. The array substrate according to claim 1, further comprising a storage line overlapping the pixel electrode to form a storage capacitor, a third test pad for testing a signal applied to the storage line and a third static electricity protecting unit connected to the third test pad.

20. An array substrate for a liquid crystal display device, comprising:
a substrate having a display region and a non-display region at a periphery of the display region;
a gate line, a data line, a thin film transistor and a pixel electrode on the substrate and in the display region;
a drive integrated circuit on the substrate and in the non-display region;
first and second test pads at both sides of the drive integrated circuit, respectively;
a common voltage line on the substrate and along edges of the non-display region; and
first and second static electricity protecting units on the substrate and in the display region, the first static electricity protecting unit connecting the first test pad with the common voltage line, and the second static electricity protecting unit connecting the second test pad with the common voltage line,
wherein the second static electricity protecting unit includes a semiconductor pattern, a first discharging line, a second discharging line respectively disposed at both sides of the semiconductor pattern, a first connection pattern and a second connection pattern, the semiconductor pattern is disposed on the gate insulating layer on the common voltage line and positioned between the common voltage line and the second test pad, wherein portions of the first and second discharging lines overlap the semiconductor pattern, and wherein the first connection pattern connects the second discharging line with the common voltage line, and the second connection pattern connects the first discharging line with the second test pad.

* * * * *